United States Patent [19]

Voigt

[11] 4,144,932
[45] Mar. 20, 1979

[54] HEAT SINK FOR ROTATING ELECTRONIC CIRCUITRY

[75] Inventor: James R. Voigt, Cleveland, Wis.

[73] Assignee: Kohler Co., Kohler, Wis.

[21] Appl. No.: 802,655

[22] Filed: Jun. 2, 1977

[51] Int. Cl.² .................. F28F 13/12; F28F 9/22; H02K 11/00

[52] U.S. Cl. .................. 165/80; 165/86; 165/122; 165/185; 174/16 HS; 310/68 D; 361/384

[58] Field of Search ............. 165/86, 80, 185, DIG. 3, 165/121, 122, 124, 126, DIG. 7; 174/16 HS; 361/384, 383; 322/DIG. 1, 28, 43; 310/58, 59, 62, 63, 68 D, 68 R, 168

[56] References Cited

U.S. PATENT DOCUMENTS

| 3,041,484 | 6/1962 | Freer et al. .................. 322/DIG. 1 |
| 3,527,972 | 9/1970 | Franz et al. .................. 310/68 D |
| 3,538,361 | 11/1970 | Hilterbrick et al. .................. 310/58 |
| 3,539,848 | 11/1970 | Dosch et al. .................. 310/68 R |
| 3,656,051 | 4/1972 | Pratt .................. 322/28 |
| 3,780,397 | 12/1973 | Harbeck et al. .................. 310/58 |
| 3,844,031 | 10/1974 | Stone et al. .................. 310/63 |
| 3,844,341 | 10/1974 | Bimshas, Jr. et al. .................. 165/86 |

FOREIGN PATENT DOCUMENTS 387469  10/1973  U.S.S.R. .................. 310/68 D

*Primary Examiner*—Sheldon J. Richter
*Attorney, Agent, or Firm*—Quarles & Brady

[57] ABSTRACT

A heat dissipating and mounting structure for an electrical circuit includes a disc which is mounted to a rotatable shaft. The disc extends outward from the shaft to present a front surface upon which the circuit is mounted and a rear surface upon which cooling fins are formed. A pair of openings are formed in the disc and cooling air flows through them when the shaft rotates. The cooling fins are rotated through the air flowing through the disc openings and heat generated by the electrical circuit is carried away with little temperature rise and minimal disturbance of the air flow.

8 Claims, 5 Drawing Figures

HEAT SINK FOR ROTATING ELECTRONIC CIRCUITRY

BACKGROUND OF THE INVENTION

The field of the invention is heat sinks, and more particularly, heat sinks for electronic components on rotating electrical machinery.

In a fast response feedback controlled generator, such as that described in U.S. Pat. No. 3,656,051, an exciter armature, an alternator field winding and an electronic current control circuit are all located on a rotating shaft. The exciter armature generates an a-c output voltage, which is rectified and regulated by the electronic current control circuit and is then applied to the alternator field winding. The current control circuit includes power dissipating devices such as resistors, silicon controlled rectifiers and triacs, and it therefore generates considerable heat which must be dissipated.

To cool the various generator windings a fan is mounted at one end of the rotating shaft for establishing an air flow along the shaft that passes over the surface areas of the rotating machinery. A structure for securely mounting the electronic current control circuit to the rotating shaft, and for cooling the same without disturbing or interrupting the flow of the cooling air is desirable for this type of apparatus. It would also be desirable to have an improved heat dissipating structure that may have general application to electrical rotating machinery having heat generating devices from which it is desired to dissipate the heat to a cooling air stream.

In prior rotating structures, heat evolving electrical components have been mounted on plates that project into a stream of cooling air. These plates may include fins oriented radially with respect to the axis of rotation. Such fins usually create radial air flow, as distinguished from an axial flow, and are noisy in operation. It is a purpose of the invention to improve upon such types of equipment.

SUMMARY OF THE INVENTION

The present invention relates to a means for attaching electrical components to a rotating shaft and dissipating heat generated by the components. More specifically, the improvement comprises a radial plate adapted to be mounted on a rotating shaft which contains openings that allow an axial flow of cooling air to progress along the shaft, and arcuately arranged fins on the plate which are rotated through the cooling air, so that the heat generated by the electrical components is dissipated through the fins to the air stream.

A general object of the invention is to provide a secure mounting structure for a rotating electronic circuit which will also dissipate heat. In a preferred form, a plate in the form of a disc is cast from a heat conductive material such as aluminum, and it is securely fastened to and disposed around a rotating shaft. The disc extends radially outward from the shaft in a plane substantially perpendicular to the shaft's axis of rotation. The electronic circuit is mounted to one surface of the disc, and heat radiating fins extend from its other surface directly opposite the electronic circuit. Heat generated by the circuit components then flows through the disc into the fins, where it is carried away by the axially directed air flow.

Another general object of the invention is to cool the electronic circuit with a minimal amount of cooling surface, and without unduly disturbing the flow of cooling air passing along the shaft. Openings in the disc allow cooling air to pass through the disc with minimal disturbance of the air flow. The fins are disposed on the downwind surface of the disc concentrically about the shaft axis in circumferential alignment with the openings. The fins then cut through the air stream that has passed through the openings. The noise level of this form of structure is reduced and air turbulence is minimized, as contrasted with centrifugal fan type devices. By having the fins slice through the cooling air stream the rate of heat dissipation is maintained at effective levels.

It is another object to provide for the dissipation of heat from electrical rotating apparatus in which the heat is generated in a localized region. In this connection, the mounting for the heat generating equipment is a part of a heat sink that is immediately adjacent a set of cooling fins.

It is another object to provide a heat dissipating mounting for rotating equipment that has good dynamic balance.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, and reference is made to the claims herein for interpreting the breadth of the invention.

DESCRIPTION OF THE PREFERRED EMBODIMENT

Figure 1:
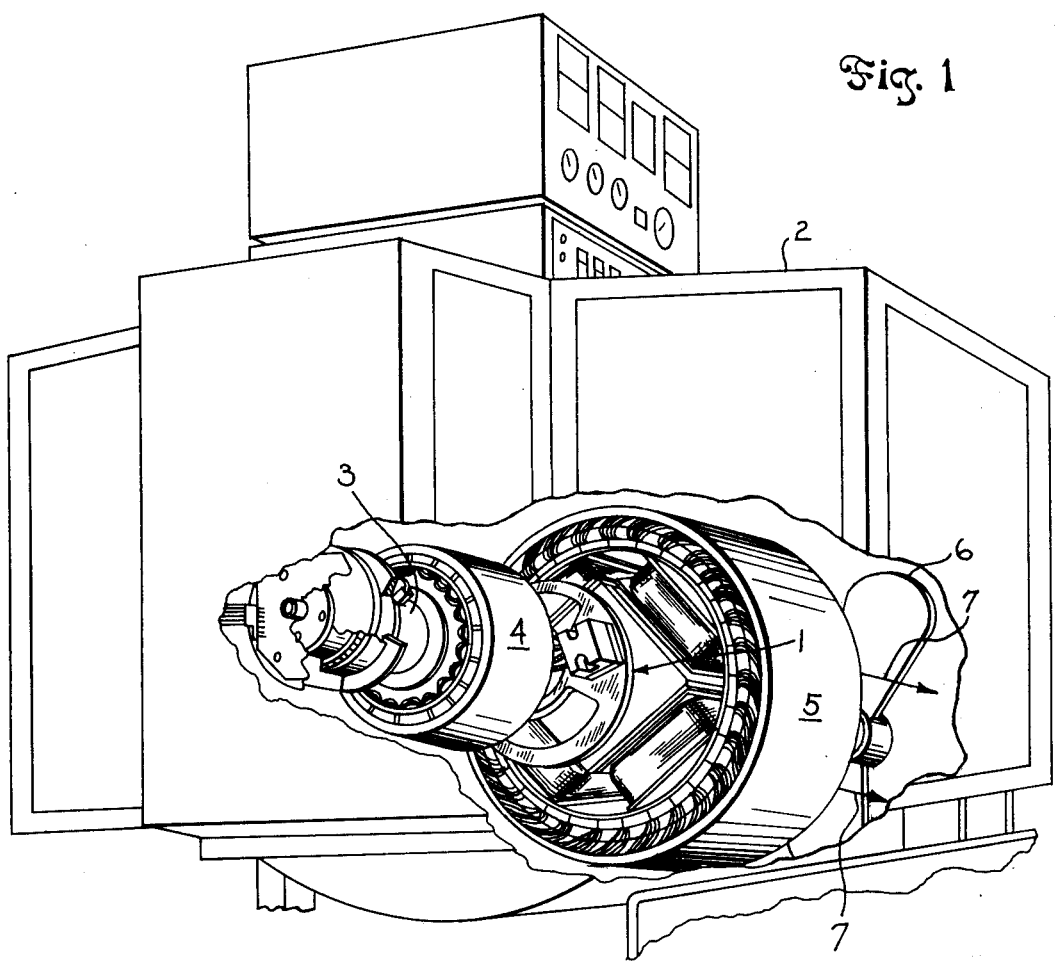
FIG. 1 is a perspective view of an electrical generator which incorporates the rotary heat dissipating and mounting structure of the present invention.

Referring to FIG. 1, the position of a rotary heat dissipating mechanism 1 embodying the invention is shown in relation to the elements of a brushless alternating current generator 2. The rotary heat dissipating mechanism 1 is securely mounted to a shaft 3 and is disposed between an exciter generator 4 and a main generator 5. A fan 6 is also mounted on the shaft 3 at the downwind end, and when the shaft 3 is rotated by an engine (not shown in the drawings), an air flow indicated by the vectors 7 is established axially along the shaft 3 to cool the generator windings.

Referring to FIGS. 2-5, the rotary heat dissipating mechanism 1 includes a plate in the form of a disc 8 which is cast from a sturdy heat conductive material such as aluminum. The disc 8 is mounted to the shaft 3 by an integral hub 9 which encircles the shaft 3, and it is positioned thereon by a key 10 for rotation therewith. The disc 8 extends radially outward from the shaft 3 in a plane substantially perpendicular to the shaft axis of rotation 11. The disc 8 has a circular shaped outer perimeter concentric with the shaft 3, although it can be appreciated that other shapes which are dynamically balanced about the axis of rotation 11 are also possible. The disc 8 presents two oppositely directed surfaces, a front, or upwind, surface 12 and a rear, or downwind, surface 13.

The disc 8 has a pair of openings 14 and 15 which are disposed radially opposite one another and communicate with both the surfaces 12 and 13. The openings 14 and 15 are generally arcuate in shape, and each extends around the shaft 3 approximately ninety degrees, and for most of the radial extent of the disc 8, to thereby provide adequate windows for the passage of cooling air traveling in the axial direction. It should be apparent to those skilled in the art that although the shape and size of air openings 14 and 15 may be altered, they should be shaped and positioned to maintain a dynamic balance for the disc 8. They could also extend to the very perimeter of the disc 8, but the annular ring-like segments 16 are retained in the embodiment shown for structural integrity.

Figure 2:
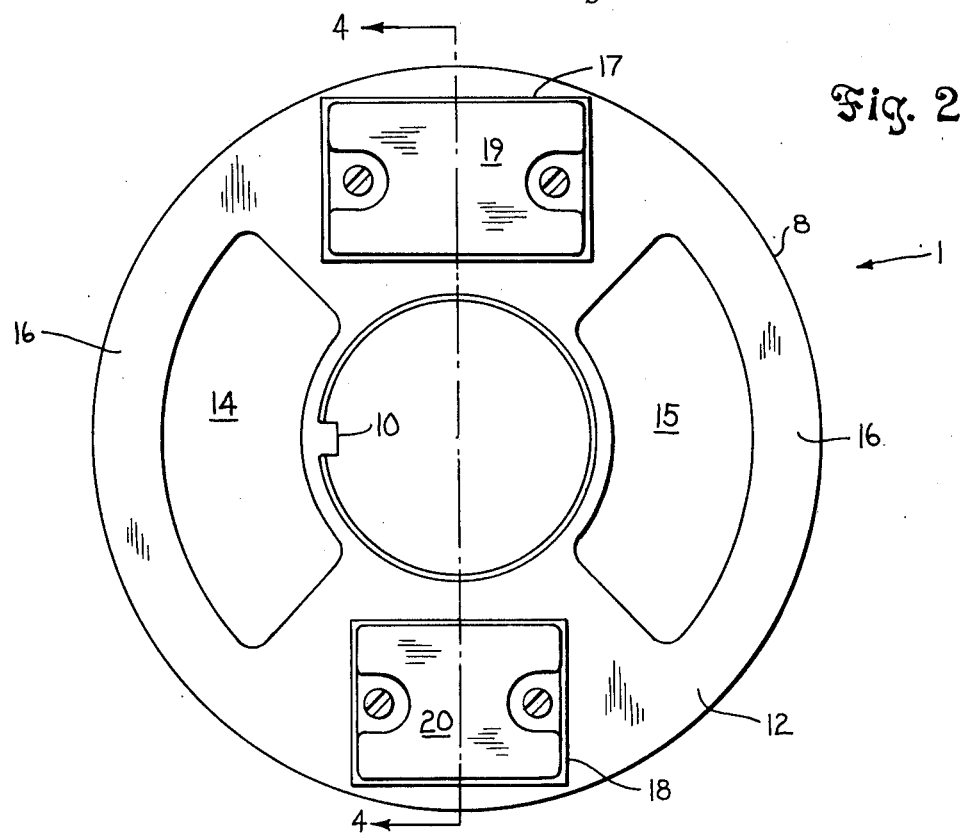
FIG. 2 is a view of the front, or upwind side of the rotary heat dissipating and mounting structure.
Figure 4:
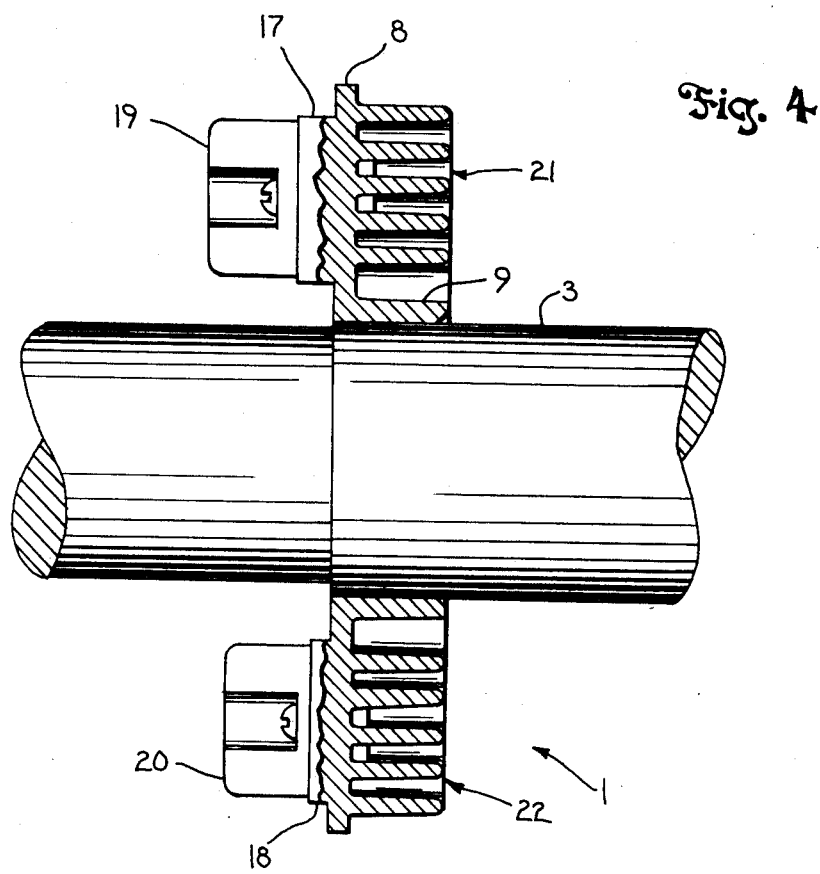
FIG. 4 is a side view in section of the rotary heat dissipating and mounting structure.

Referring specifically to FIGS. 2 and 4, a pair of mounting pads 17 and 18 are disposed on the front surface 12 as an integral part of the disc 8. These mounting pads 17 and 18 are rectangular in shape and are positioned on radially opposite sides of the axis of rotation 11 to maintain balance. Heat evolving electronic circuit packages 19 and 20 are tightly fastened to the pads 17 and 18 to provide high thermal conductivity between them and the disc 8. Because the electronic circuit packages 19 and 20 may differ substantially in weight, the thicknesses of the mounting pads 17 and 18 may be adjusted to dynamically balance the system. Indeed, if only one electronic circuit package is required the opposite mounting pad may be substantially thicker to provide the necessary counterbalancing weight.

Figure 3:
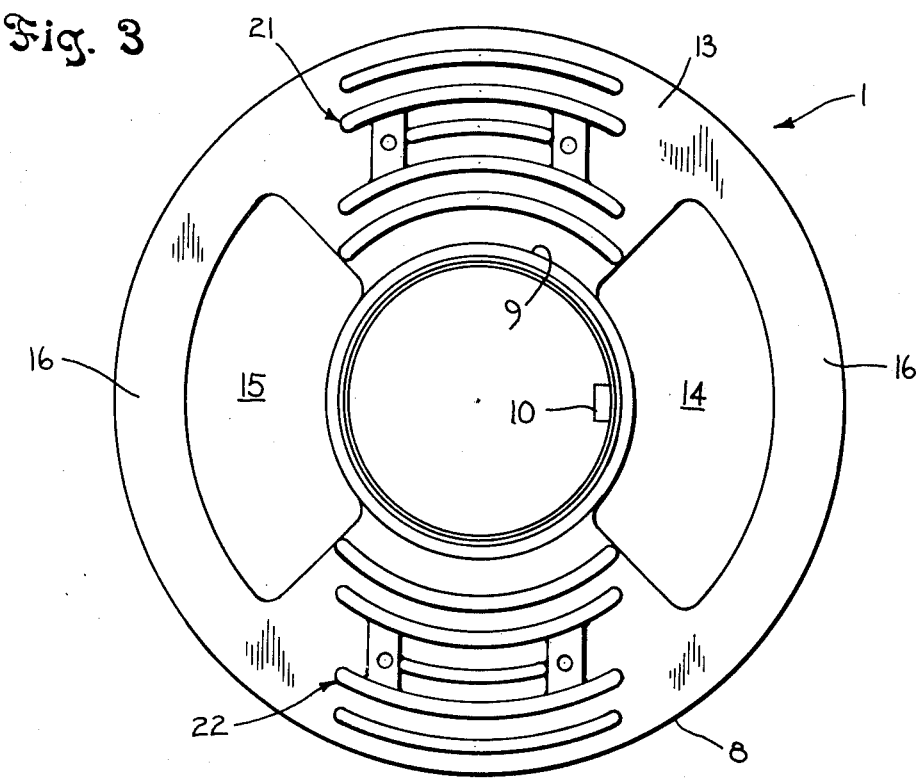
FIG. 3 is a view of the rear, or downwind side of the rotary heat dissipating and mounting structure.
Figure 5:
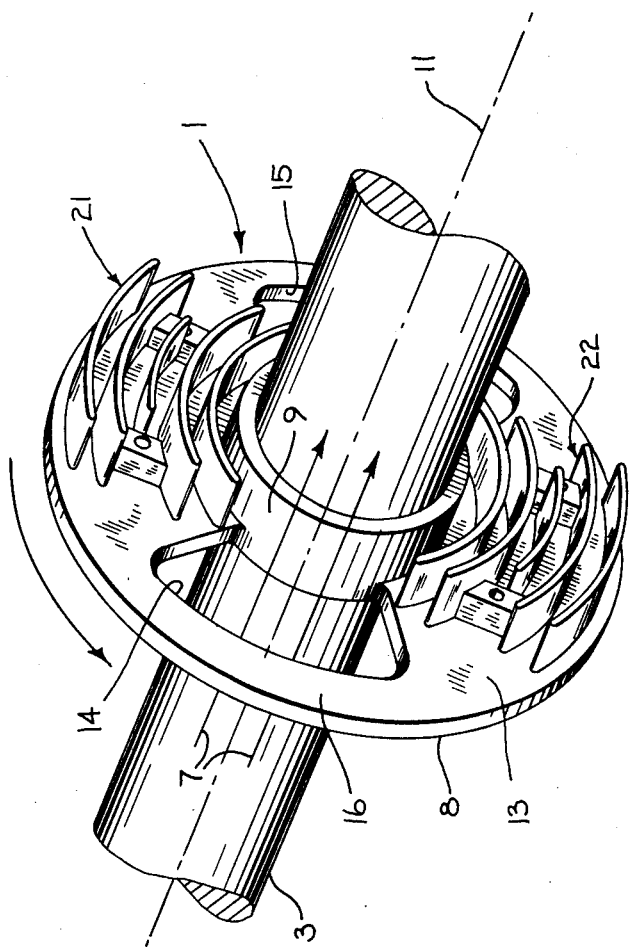
FIG. 5 is a view in perspective of the rotary heat dissipating and mounting structure assembled upon a shaft.

As shown best in FIGS. 3, 4 and 5, the rotary heat dissipating mechanism 1 has two sets of integrally formed cooling fins 21 and 22 which extend from the rear surface 13 of the disc 8. Each set of fins 21 and 22 is located immediately behind a mounting pad 17 or 18 and the fin sets 21 and 22 are disposed on opposite sides of the shaft axis to again maintain a dynamic balance. Each individual fin is generally arcuate in shape, when viewed along the shaft axis 11, and the large surfaces of each extend circumferentially and axially in a perpendicular relation to the disc surface 13. The fins in each set 21 and 22 are also concentrically arranged with one another and the axis of rotation 11. The fin sets 21, 22 are in substantial circumferential alignment with the openings 14, 15, so that they will rotate through common circles of orbit.

Referring to FIGS. 1 and 5, the air drawn into the generator 2 by the fan 6 flows in a generally axial direction, as indicated by the vectors 7. The electronic circuit packages 19 and 20 are exposed directly to the air flow and the resultant cooling effect it may have. A substantial portion of the air stream flows through the openings 14 and 15 in its travel along the shaft 3. As this air emerges on the downwind side 13 of the disc 8 it will be cut by the fin sets 21, 22. The rotating fins thus slice through an axial flow of air and have their surfaces exposed to this air stream without making any substantial change in the direction of air flow, or creating an undesirable turbulence.

Heat generated within the packages 19 and 20 is conducted through the pads 17, 18, the disc 8 and into the fins 21 and 22. Although the fins 21 and 22 are disposed on the rear surface of the disc 8, they continuously contact cooling air to effect a heat transfer away from the apparatus. Air is heated by the fins 21 and 22, and the air is exchanged for cooler ambient air that is traveling in the axial direction.

The circular motion of the fins 21 and 22 contrasts from arrangements in which fins are positioned in radial planes to act as paddles of a centrifugal type fan. The fin position of the invention causes little noise and less disturbance of the air flow pattern, so that an axial flow of air can be maintained for cooling several elements spaced axially along a shaft.

A particular advantage is that heat can be dissipated from localized sources of the heat. The heat transfer to the fins is directly through the narrow width of the mounting disc, and the fins are arranged with large, circular extending surface areas in the immediate vicinity of the heat source. Also, the axial extent of the fins can be much less than the arcuate extent, so that the heat dissipating apparatus can be confined to a small segment of the shaft length.

I claim:

1. In a heat dissipating structure the combination comprising:
   a plate member adapted to be mounted for rotation about an axis that is substantially normal to the plate member;
   cooling fins on said plate member with the large surface areas thereof extending axially along and arcuately about said axis; and
   said plate member having at least one opening that is circumferentially aligned with said cooling fins.

2. A structure as in claim 1 in which said plate has circuit mounting means on one surface thereof and said cooling fins extend axially outward from the opposite surface in axial alignment with said mounting means.

3. In a heat dissipating structure for a machine having a shaft which rotates about an axis and heat generating electrical components, the combination comprising:
   a disc mounted to said shaft and extending radially outward therefrom in a plane substantially perpendicular to said axis, the disc having a pair of oppositely facing surfaces, and at least one opening formed therethrough;
   means for mounting said electrical components on one of the surfaces of the disc; and
   a set of arcuate cooling fins circumferentially aligned with said opening and mounted on the other surface of the disc, said cooling fins having the large surface areas thereof extending axially along and arcuately about said axis, and
   said cooling fins each extending substantially perpendicular from said other disc surface and each being concentrically aligned with respect to one another about said axis.

4. The mounting structure as recited in claim 3 in which said means for mounting the electrical components includes a mounting pad formed from heat conductive material.

5. The mounting structure as recited in claim 3 in which the set of cooling fins is positioned on said other disc surface directly opposite the means for mounting said electrical components.

6. The mounting structure as recited in claim 3 in which the radial extent of said cooling fins is substantially coextensive with the radial extent of said openings.

7. The mounting structure as recited in claim 6 in which cooling air flows in the direction of said shaft axis, and impinges against said one disc surface, and said other disc surface faces downwind.

8. In a heat dissipating structure for a machine having a shaft which rotates about an axis and means for establishing a flow of cooling air along the shaft, a mounting structure for a rotating electrical circuit comprising:

a disc mounted to said shaft and extending radially outward therefrom to form an upwind surface against which the cooling air impinges and a substantially oppositely facing downwind surface, said disc having openings formed therethrough which are disposed on opposite sides of said shaft axis and which each communicate with both of said surfaces;

means disposed on said upwind surface for mounting said electrical circuit; and arcuate cooling fins disposed on the downwind disc surface and arranged in sets which are positioned on opposite sides of said shaft axis, said cooling fins having the large surface areas thereof extending axially along and arcuately about said axis, and the cooling fins within each set being arranged concentrically with respect to each other about said shaft axis, and the radial extent of said cooling fins being substantially coextensive with the radial extent of said openings.

* * * * *